US010165612B2

(12) United States Patent
Zeung

(10) Patent No.: US 10,165,612 B2
(45) Date of Patent: Dec. 25, 2018

(54) WIRELESS CONNECTING METHOD, COMPUTER, AND NON-TRANSITORY COMPUTER-READABLE STORAGE MEDIUM

(71) Applicant: I/O INTERCONNECT, LTD., Santa Ana, CA (US)

(72) Inventor: Ping-Shun Zeung, Taipei (TW)

(73) Assignee: I/O INTERCONNECTED, LTD., Santa Ana, CA (US)

(*) Notice: Subject to any disclaimer, the term of this patent is extended or adjusted under 35 U.S.C. 154(b) by 0 days.

(21) Appl. No.: 15/869,512

(22) Filed: Jan. 12, 2018

(65) Prior Publication Data

US 2018/0139795 A1 May 17, 2018

Related U.S. Application Data

(63) Continuation-in-part of application No. 15/183,884, filed on Jun. 16, 2016, now Pat. No. 9,906,893.

(51) Int. Cl.

| H04W 76/14 | (2018.01) |
| H04W 8/22 | (2009.01) |
| H04W 48/16 | (2009.01) |
| H04W 48/18 | (2009.01) |
| H04W 84/20 | (2009.01) |
| H04W 4/80 | (2018.01) |

(52) U.S. Cl.
CPC ............. *H04W 76/14* (2018.02); *H04W 8/22* (2013.01); *H04W 48/16* (2013.01); *H04W 48/18* (2013.01); *H04W 84/20* (2013.01); *H04W 4/80* (2018.02)

(58) Field of Classification Search
CPC ....... H04W 76/14; H04W 8/22; H04W 48/16; H04W 48/18; H04W 84/20; H04W 84/80
USPC ......................................................... 544/41.2
See application file for complete search history.

(56) References Cited

U.S. PATENT DOCUMENTS

| 6,366,622 B1 * | 4/2002 | Brown | H04B 1/30 329/304 |
| 6,731,939 B1 * | 5/2004 | Watanabe | H04W 72/08 455/450 |
| 6,760,804 B1 * | 7/2004 | Hunt | G06F 9/541 370/310 |
| 7,003,102 B2 * | 2/2006 | Kiko | H04B 3/54 379/413 |
| 7,043,205 B1 * | 5/2006 | Caddes | H04W 76/023 455/41.2 |
| 7,047,051 B2 * | 5/2006 | Sackett | H04W 52/0229 455/574 |
| 7,165,171 B2 * | 1/2007 | Zhang | G06F 9/4401 710/10 |
| 7,215,649 B2 * | 5/2007 | Yu | H04M 1/7253 370/257 |

(Continued)

*Primary Examiner* — Hai V Nguyen
(74) *Attorney, Agent, or Firm* — Locke Lord LLP; Tim Tingkang Xia, Esq.

(57) ABSTRACT

A wireless connecting method is disclosed. The wireless connecting method includes the following operations: connecting a device to a computer by BLUETOOTH; determining the computer is a host or a accessory for the device; operating the computer as the host for the device by a Microsoft BLUETOOTH stack if the computer is the host for the device; and operating the computer as the accessory for the device by an application if the computer is the accessory for the device. The computer is operated as the host and the accessory at the same time.

20 Claims, 5 Drawing Sheets

(56) References Cited

U.S. PATENT DOCUMENTS

| | | | | |
|---|---|---|---|---|
| 7,257,398 B1* | 8/2007 | Ukita | H04M 1/6066 | 348/14.05 |
| 7,269,183 B2* | 9/2007 | Morris | H04W 76/15 | 370/466 |
| 7,436,300 B2* | 10/2008 | Glass | G06F 21/31 | 340/568.1 |
| 7,506,148 B2* | 3/2009 | Zhang | G06F 9/4401 | 713/1 |
| 7,596,353 B2* | 9/2009 | Chung | H04W 84/18 | 370/368 |
| 7,599,662 B2* | 10/2009 | Ibrahim | H03J 7/02 | 455/41.2 |
| 7,774,027 B2* | 8/2010 | Parikh | H04W 88/06 | 455/41.2 |
| 7,801,561 B2* | 9/2010 | Parikh | H04W 8/005 | 455/41.2 |
| 8,014,339 B1* | 9/2011 | Moore | H04W 88/10 | 370/229 |
| 8,050,647 B2* | 11/2011 | Ibrahim | H03J 7/02 | 455/313 |
| 8,073,388 B2* | 12/2011 | Grushkevich | H04W 74/06 | 370/449 |
| 8,095,078 B2* | 1/2012 | Benkert | H04W 8/005 | 455/41.2 |
| 8,190,716 B2* | 5/2012 | Zhodzishsky | G06F 21/85 | 709/220 |
| 8,208,854 B2* | 6/2012 | Winter | H04L 12/66 | 455/41.2 |
| 8,224,247 B2* | 7/2012 | Kidron | G10L 19/167 | 370/473 |
| 8,249,649 B2* | 8/2012 | Tseng | H04W 48/18 | 370/331 |
| 8,287,434 B2* | 10/2012 | Zavadsky | A63B 21/00 | 482/1 |
| 8,346,170 B2* | 1/2013 | Preston | H04M 1/6066 | 455/41.2 |
| 8,346,171 B1* | 1/2013 | Mack | H04W 52/0206 | 455/63.1 |
| 8,554,138 B2* | 10/2013 | Higgins | H04W 4/10 | 455/41.2 |
| 8,620,379 B2* | 12/2013 | Zhodzishsky | H04L 69/32 | 370/252 |
| 8,700,089 B2* | 4/2014 | Tseng | H04W 48/18 | 370/331 |
| 8,761,671 B2* | 6/2014 | Singer | H04W 80/02 | 370/357 |
| 8,798,541 B1* | 8/2014 | Scott | G06F 9/45545 | 455/41.2 |
| 8,838,697 B2* | 9/2014 | Lashkari | H04W 4/023 | 709/205 |
| 8,862,399 B2* | 10/2014 | Schmidt | G01C 21/3661 | 701/522 |
| 8,892,175 B2* | 11/2014 | Kirsch | H04M 1/6091 | 455/569.2 |
| 8,897,764 B2* | 11/2014 | Takikawa | H04W 4/046 | 455/418 |
| 8,942,632 B2* | 1/2015 | Shen | H04W 88/04 | 455/41.2 |
| 8,950,935 B1* | 2/2015 | Khachaturian | A61B 5/742 | 374/170 |
| 8,964,298 B2* | 2/2015 | Haddick | G06F 3/013 | 359/630 |
| 8,965,090 B1* | 2/2015 | Khachaturian | A61B 5/0261 | 382/128 |
| 8,976,724 B2* | 3/2015 | Hauser | H04W 88/04 | 370/315 |
| 9,049,042 B2* | 6/2015 | Tagg | H04L 12/2856 | |
| 9,144,094 B2* | 9/2015 | Bhamidipati | H04N 21/42207 | |
| 9,189,182 B2* | 11/2015 | Jung | G06F 3/1221 | |
| 9,229,854 B1* | 1/2016 | Kuzmin | G06F 8/654 | |
| 9,237,217 B2* | 1/2016 | Zeung | H04M 1/7253 | |
| 9,306,872 B2* | 4/2016 | Donaldson | H04L 49/20 | |
| 9,383,772 B2* | 7/2016 | Zeung | G06F 1/1632 | |
| 9,544,718 B2* | 1/2017 | Song | H04L 65/602 | |
| 9,680,885 B2* | 6/2017 | Yamada | H04L 12/1822 | |
| 9,710,377 B1* | 7/2017 | Kuzmin | G06F 8/654 | |
| 9,813,845 B2* | 11/2017 | Kim | H04W 76/14 | |
| 9,906,893 B2* | 2/2018 | Zeung | G06F 8/61 | |
| 9,949,038 B2* | 4/2018 | Guindi | H04R 25/305 | |
| 2001/0019956 A1* | 9/2001 | Tada | H04W 52/0232 | 455/434 |
| 2002/0012329 A1* | 1/2002 | Atkinson | G06F 9/4411 | 370/330 |
| 2002/0062397 A1* | 5/2002 | Chang | G06F 3/1204 | 709/246 |
| 2002/0172218 A1* | 11/2002 | Harrison | H04L 12/5692 | 370/449 |
| 2003/0013411 A1* | 1/2003 | Uchiyama | H04M 1/725 | 455/40 |
| 2003/0068033 A1* | 4/2003 | Kiko | H04B 3/54 | 379/413 |
| 2003/0087681 A1* | 5/2003 | Sackett | H04W 52/0229 | 455/574 |
| 2003/0144029 A1* | 7/2003 | Wu | H04W 88/02 | 455/557 |
| 2004/0070488 A1* | 4/2004 | Stockhammer | G06Q 10/02 | 340/5.61 |
| 2004/0136338 A1* | 7/2004 | Lin | H04W 84/18 | 370/329 |
| 2004/0198219 A1* | 10/2004 | Malmstrom | G06F 13/4045 | 455/41.1 |
| 2004/0230790 A1* | 11/2004 | Zhang | G06F 9/4401 | 713/2 |
| 2005/0073991 A1* | 4/2005 | Roberts | G06F 17/30581 | 370/350 |
| 2005/0083741 A1* | 4/2005 | Chang | G06F 9/445 | 365/200 |
| 2005/0107103 A1* | 5/2005 | Melpignano | H04J 3/0697 | 455/502 |
| 2005/0152294 A1* | 7/2005 | Yu | H04M 1/7253 | 370/310 |
| 2005/0181729 A1* | 8/2005 | Ibrahim | H03J 7/02 | 455/41.2 |
| 2005/0197064 A1* | 9/2005 | Ibrahim | H04L 25/063 | 455/41.2 |
| 2005/0286466 A1* | 12/2005 | Tagg | H04L 12/2856 | 370/329 |
| 2006/0025075 A1* | 2/2006 | Chung | H04W 84/18 | 455/41.2 |
| 2006/0068760 A1* | 3/2006 | Hameed | H04L 63/061 | 455/412.1 |
| 2006/0105712 A1* | 5/2006 | Glass | G06F 21/31 | 455/41.2 |
| 2006/0116107 A1* | 6/2006 | Hulvey | H04M 1/6066 | 455/411 |
| 2006/0234632 A1* | 10/2006 | Lin | H04W 8/245 | 455/41.2 |
| 2006/0293905 A1* | 12/2006 | Ramanathan | G06Q 10/10 | 709/206 |
| 2007/0099568 A1* | 5/2007 | Yang | H04W 28/18 | 455/41.2 |
| 2007/0150560 A1* | 6/2007 | Zhang | G06F 9/4401 | 709/220 |
| 2007/0173270 A1* | 7/2007 | Block | H04W 74/06 | 455/507 |
| 2007/0211624 A1* | 9/2007 | Schmidt | H04L 12/5692 | 370/225 |
| 2008/0002758 A1* | 1/2008 | Schmidt | H04W 28/18 | 375/130 |
| 2008/0052384 A1* | 2/2008 | Marl | H04L 12/2807 | 709/223 |
| 2008/0070504 A1* | 3/2008 | Benkert | H04W 8/005 | 455/41.2 |
| 2008/0081559 A1* | 4/2008 | Parikh | H04W 88/06 | 455/41.2 |
| 2008/0081667 A1* | 4/2008 | Parikh | H04W 8/005 | 455/558 |

(56) References Cited

U.S. PATENT DOCUMENTS

| | | | |
|---|---|---|---|
| 2008/0207126 A1* | 8/2008 | Grushkevich | H04W 74/06 455/41.2 |
| 2008/0230609 A1* | 9/2008 | Singh | G06F 9/4411 235/441 |
| 2008/0232605 A1* | 9/2008 | Bagha | A61B 7/04 381/67 |
| 2008/0274695 A1* | 11/2008 | Muth | G06F 3/038 455/41.2 |
| 2008/0279129 A1* | 11/2008 | Zhodzishsky | H04W 48/18 370/311 |
| 2008/0287063 A1* | 11/2008 | Kidron | G10L 19/167 455/41.2 |
| 2008/0294340 A1* | 11/2008 | Schmidt | G01C 21/3661 701/469 |
| 2008/0311852 A1* | 12/2008 | Hansen | H04W 88/06 455/41.2 |
| 2009/0001160 A1* | 1/2009 | Davis | H04W 76/19 235/380 |
| 2009/0014519 A1* | 1/2009 | Singh | G06K 7/0008 235/437 |
| 2009/0061775 A1* | 3/2009 | Warren | H04M 1/6091 455/41.2 |
| 2009/0204964 A1* | 8/2009 | Foley | G06F 21/53 718/1 |
| 2009/0232041 A1* | 9/2009 | Smith | H04L 1/1867 370/312 |
| 2009/0281835 A1* | 11/2009 | Patwardhan | G06F 19/3456 705/3 |
| 2009/0312010 A1* | 12/2009 | Hall | H04W 72/1215 455/426.1 |
| 2009/0318081 A1* | 12/2009 | Winter | H04L 12/66 455/41.2 |
| 2010/0009673 A1* | 1/2010 | Ibrahim | H03J 7/02 455/423 |
| 2010/0041330 A1* | 2/2010 | Elg | H04M 1/72522 455/3.06 |
| 2010/0197326 A1* | 8/2010 | Ngo | G06F 8/65 455/466 |
| 2010/0202346 A1* | 8/2010 | Sitzes | H04W 84/18 370/328 |
| 2010/0284380 A1* | 11/2010 | Banerjee | H04W 16/14 370/338 |
| 2010/0328216 A1* | 12/2010 | Honda | G06F 3/038 345/163 |
| 2011/0021142 A1* | 1/2011 | Desai | H04W 8/005 455/41.2 |
| 2011/0034125 A1* | 2/2011 | Preston | H04M 1/6066 455/41.2 |
| 2011/0034126 A1* | 2/2011 | Higgins | H04W 4/10 455/41.2 |
| 2011/0071997 A1* | 3/2011 | Sullivan | G06F 17/30887 707/706 |
| 2011/0107117 A1* | 5/2011 | Jung | G06F 3/1221 713/300 |
| 2011/0158217 A1* | 6/2011 | Meng | H04L 12/4633 370/338 |
| 2011/0251021 A1* | 10/2011 | Zavadsky | A63B 21/00 482/5 |
| 2011/0255454 A1* | 10/2011 | Hauser | H04W 88/04 370/311 |
| 2011/0320624 A1* | 12/2011 | Schmidt | G01C 21/3661 709/230 |
| 2012/0003973 A1* | 1/2012 | Tseng | H04W 48/18 455/426.1 |
| 2012/0005382 A1* | 1/2012 | Chatterjee | G06F 13/102 710/105 |
| 2012/0057456 A1* | 3/2012 | Bogatin | H04W 28/08 370/230.1 |
| 2012/0057518 A1* | 3/2012 | Herrala | H04W 84/20 370/315 |
| 2012/0094757 A1* | 4/2012 | Vago | H04L 67/42 463/31 |
| 2012/0142271 A1* | 6/2012 | Zhodzishsky | H04L 67/303 455/41.2 |
| 2012/0165062 A1* | 6/2012 | Preston | H04M 1/6066 455/518 |
| 2012/0185071 A1* | 7/2012 | Kwon | G01R 33/07 700/94 |
| 2012/0203877 A1* | 8/2012 | Bartholomay | H04L 63/0227 709/221 |
| 2012/0302170 A1* | 11/2012 | Frazier | H04W 84/20 455/41.3 |
| 2013/0010764 A1* | 1/2013 | Tseng | H04W 48/18 370/335 |
| 2013/0065680 A1* | 3/2013 | Zavadsky | A63B 21/00 463/30 |
| 2013/0090931 A1* | 4/2013 | Ghovanloo | G06F 3/011 704/275 |
| 2013/0127980 A1* | 5/2013 | Haddick | G06F 3/013 348/14.08 |
| 2013/0137415 A1* | 5/2013 | Takikawa | H04W 4/046 455/418 |
| 2013/0238711 A1* | 9/2013 | Lashkari | H04W 4/023 709/205 |
| 2013/0278631 A1* | 10/2013 | Border | G02B 27/017 345/633 |
| 2013/0288606 A1* | 10/2013 | Kirsch | H04M 1/6091 455/41.3 |
| 2014/0067957 A1* | 3/2014 | Yamada | H04L 12/1822 709/204 |
| 2014/0120829 A1* | 5/2014 | Bhamidipati | H04N 21/42207 455/3.06 |
| 2014/0169795 A1* | 6/2014 | Clough | G06F 19/3418 398/106 |
| 2014/0297900 A1* | 10/2014 | Herbert | G06F 11/3051 710/16 |
| 2014/0335902 A1* | 11/2014 | Guba | H04W 4/027 455/456.4 |
| 2014/0342669 A1* | 11/2014 | Zeung | H04M 1/7253 455/41.2 |
| 2014/0344494 A1* | 11/2014 | Zeung | G06F 1/1632 710/303 |
| 2015/0010179 A1* | 1/2015 | Solum | H04R 25/558 381/315 |
| 2015/0024804 A1* | 1/2015 | Davis | H04M 1/6066 455/569.1 |
| 2015/0147968 A1* | 5/2015 | Friedman | G06F 3/017 455/41.2 |
| 2015/0223272 A1* | 8/2015 | Parkinson | G10L 19/0017 455/41.2 |
| 2015/0281853 A1* | 10/2015 | Eisner | H04R 25/505 381/312 |
| 2015/0281877 A1* | 10/2015 | Walden | H04W 4/80 455/41.2 |
| 2015/0365979 A1* | 12/2015 | Park | H04W 4/02 455/404.2 |
| 2016/0012465 A1* | 1/2016 | Sharp | G06Q 20/18 705/14.17 |
| 2016/0014545 A1* | 1/2016 | Tian | H04W 76/10 455/41.2 |
| 2016/0037389 A1* | 2/2016 | Tagg | H04L 12/2856 370/331 |
| 2016/0073908 A1* | 3/2016 | Khachaturian | A61B 5/01 600/474 |
| 2016/0080896 A1* | 3/2016 | Song | H04L 65/602 455/41.2 |
| 2016/0100275 A1* | 4/2016 | Viswanadham | H04L 12/1886 455/41.2 |
| 2016/0117813 A1* | 4/2016 | Gross | H04W 76/10 600/474 |
| 2016/0119320 A1* | 4/2016 | Bansal | H04W 12/12 705/14.26 |
| 2016/0134996 A1* | 5/2016 | Verma | H04L 12/1822 709/205 |
| 2016/0140370 A1* | 5/2016 | Pierce | G06K 7/10821 235/462.25 |
| 2016/0150105 A1* | 5/2016 | Shinomiya | H04N 1/00307 358/1.15 |

(56) References Cited

U.S. PATENT DOCUMENTS

| | | | | |
|---|---|---|---|---|
| 2016/0184635 A1* | 6/2016 | Kwon | ................... | H04W 76/10 |
| | | | | 455/41.2 |
| 2016/0189143 A1* | 6/2016 | Koeppel | ............ | G06K 19/0739 |
| | | | | 705/41 |
| 2016/0249356 A1* | 8/2016 | Pope | ....................... | H04L 65/60 |
| 2016/0262056 A1* | 9/2016 | Chen | .................... | H04W 28/20 |
| 2016/0277875 A1* | 9/2016 | Ivanova | ................ | H04W 76/14 |
| 2016/0306966 A1* | 10/2016 | Srivastava | .............. | G06F 21/31 |
| 2016/0334837 A1* | 11/2016 | Dees | ....................... | H04L 67/16 |
| 2016/0359925 A1* | 12/2016 | Song | ................... | H04L 65/1069 |
| 2016/0360345 A1* | 12/2016 | Kim | ....................... | H04W 76/14 |
| 2016/0366263 A1* | 12/2016 | Song | ....................... | H04W 4/90 |
| 2016/0371961 A1* | 12/2016 | Narang | ................ | H04W 8/005 |
| 2017/0006414 A1* | 1/2017 | Tomassini | ............ | H04B 5/0037 |
| 2017/0006415 A1* | 1/2017 | Song | ....................... | H04W 4/80 |
| 2017/0034646 A1* | 2/2017 | Song | ................... | H04W 8/005 |
| 2017/0135125 A1* | 5/2017 | Buthler | ............ | H04W 72/1263 |
| 2017/0150533 A1* | 5/2017 | Alipour | ................ | H04W 76/10 |
| 2017/0188181 A1* | 6/2017 | Jin | .................... | H04W 72/1215 |
| 2017/0366923 A1* | 12/2017 | Zeung | ....................... | G06F 8/61 |
| 2018/0235468 A1* | 8/2018 | Khachaturian | .... | A61B 5/02427 |
| 2018/0253264 A1* | 9/2018 | Chang | ................... | G06F 3/1204 |

* cited by examiner

WIRELESS CONNECTING METHOD, COMPUTER, AND NON-TRANSITORY COMPUTER-READABLE STORAGE MEDIUM

CROSS-REFERENCE TO RELATED APPLICATION

This application is a continuation-in-part of U.S. application Ser. No. 15/183,884, filed on Jun. 16, 2016, the full disclosure of which is incorporated herein by reference.

FIELD OF INVENTION

The invention relates to a wireless connecting method, a computer, and a non-transitory computer-readable storage medium. More particularly, the invention relates to a wireless connecting method, a computer, and a non-transitory computer-readable storage medium for wireless connection by BLUETOOTH between a computer and other devices.

BACKGROUND

BLUETOOTH is a wireless technology standard for exchanging data over short distances (using short-wavelength UHF radio waves in the ISM band from 2.4 to 2.485 GHz) from fixed and mobile devices and building personal area networks (PANs). It can connect several devices, overcoming problems of synchronization.

According to the BLUETOOTH specification, when a personal computer (PC), such as a desktop or a laptop computer, is connected with one or more external devices through BLUETOOTH, the PC generally serves as a BLUETOOTH host device and the external devices serve as BLUETOOTH accessory devices. In other words, a PC itself cannot be a Bluetooth accessory of other Bluetooth device. A way to solve the problem is to implement a BLUETOOTH application so that the PC may work as a host and an accessory of the connected device at the same time.

However, the Microsoft system has the Microsoft Bluetooth stack which may operate the PC as a host for a device connected to the PC by Bluetooth originally, and it may be convenience if the BLUETOOTH application implemented can co-exist with the Microsoft Bluetooth stack.

SUMMARY

An embodiment of this disclosure is to provide a wireless connecting method includes the following operations: connecting a device to a computer by BLUETOOTH; determining the computer is a host or accessory for the device; operating the computer as the host for the device by a Microsoft BLUETOOTH stack if the computer is the host for the device; and operating the computer as the accessory for the device by an application if the computer is the accessory for the device. The computer is operated as the host and accessory at the same time.

An embodiment of this disclosure is to provide a computer includes a memory and a processor. The memory includes an application to handle a device connected to the computer by BLUETOOTH. The processor is configured to run the application to determine whether the computer is a host or a accessory for the device. The processor operates the computer as the host for the device by a Microsoft BLUETOOTH stack if the computer is the host for the device, and the processor operates the computer as the accessory for the device by an application if the computer is the accessory for the device. The computer is operated as the host and the accessory at the same time.

The embodiment of the present disclosure is to provide a non-transitory computer-readable storage medium storing a computer program performing a wireless connecting method. The wireless connecting method includes the following operations: connecting a device to a computer by BLUETOOTH; determining the computer is a host or a accessory for the device; operating the computer as the host for the device by a Microsoft BLUETOOTH stack if the computer is the host for the device; and operating the computer as the accessory for the device by an application if the computer is the accessory for the device. The computer is operated as the host and the accessory at the same time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
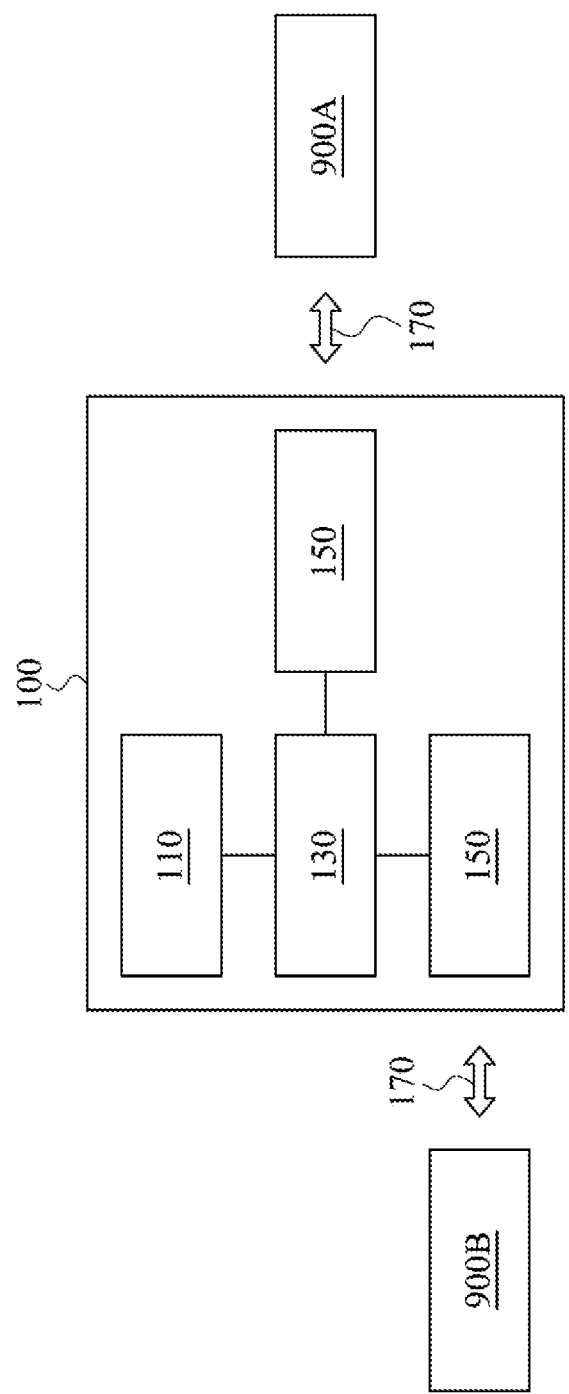
FIG. 1 is a schematic diagram illustrating a computer according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating a computer 100 according to some embodiments of the present disclosure. As illustrated in FIG. 1, the computer 100 includes a memory 110, a processor 130, and several communication interfaces 150. The computer 100 may be connected to the device 900A, 900B through connection 170 and the communication interfaces 150. In some embodiments, the connection 170 may be wire connection or wireless connection. In some embodiments, the device 900A and the device 900B may be smartphones, music players, mouse, keyboards, speakers, or any other devices with similar functions. The computer 100 shown in FIG. 1 is for illustrative purposes only and the present disclosure is not limited thereto.

In some embodiments, the memory 110 includes an application. The application is configured to handle the device 900 which is connected to the computer 100 by BLUETOOTH connection 170. The processor 130 is configured to run the application to determine whether the computer 100 is an accessory or a host for the device 900A or the device 900B when the device 900A or the device 900B is connected to the computer 100 by BLUETOOTH connection 170.

In some embodiments, for example, if the processor 130 determines the computer 100 to run as the accessory and the device 900A to run as the host when the device 900A is connected to the computer 100 by BLUETOOTH connection 170, the processor 130 operates the computer 100 as the accessory for the device 900A by the application. In some embodiments, if the processor 130 determines the computer 100 to run as the host and the device 900A to run as the accessory when the device 900A is connected to the computer 100 by BLUETOOTH connection 170, the processor 130 operates the computer 100 as the host for the device 900A by the Microsoft BLUETOOTH stack. When the device 900A works as the host, the computer 100 and the device 900B all become peripheral devices (accessories) of the device 900A.

Furthermore, in the present disclosure, the computer 100 may operate as the host and the accessory at the same time. For example, the device 900A and the device 900B may connect to the computer 100 by the BLUETOOTH connection 170 at the same time. The device 900A is the accessory and the computer 100 is the master; meanwhile, the device 900B is the host and the computer 100 is the slave. The computer 100 operates as the host for the device 900A by the Microsoft BLUETOOTH stack. The computer 100 operates as the accessory for the device 900B by the application.

Figure 2:
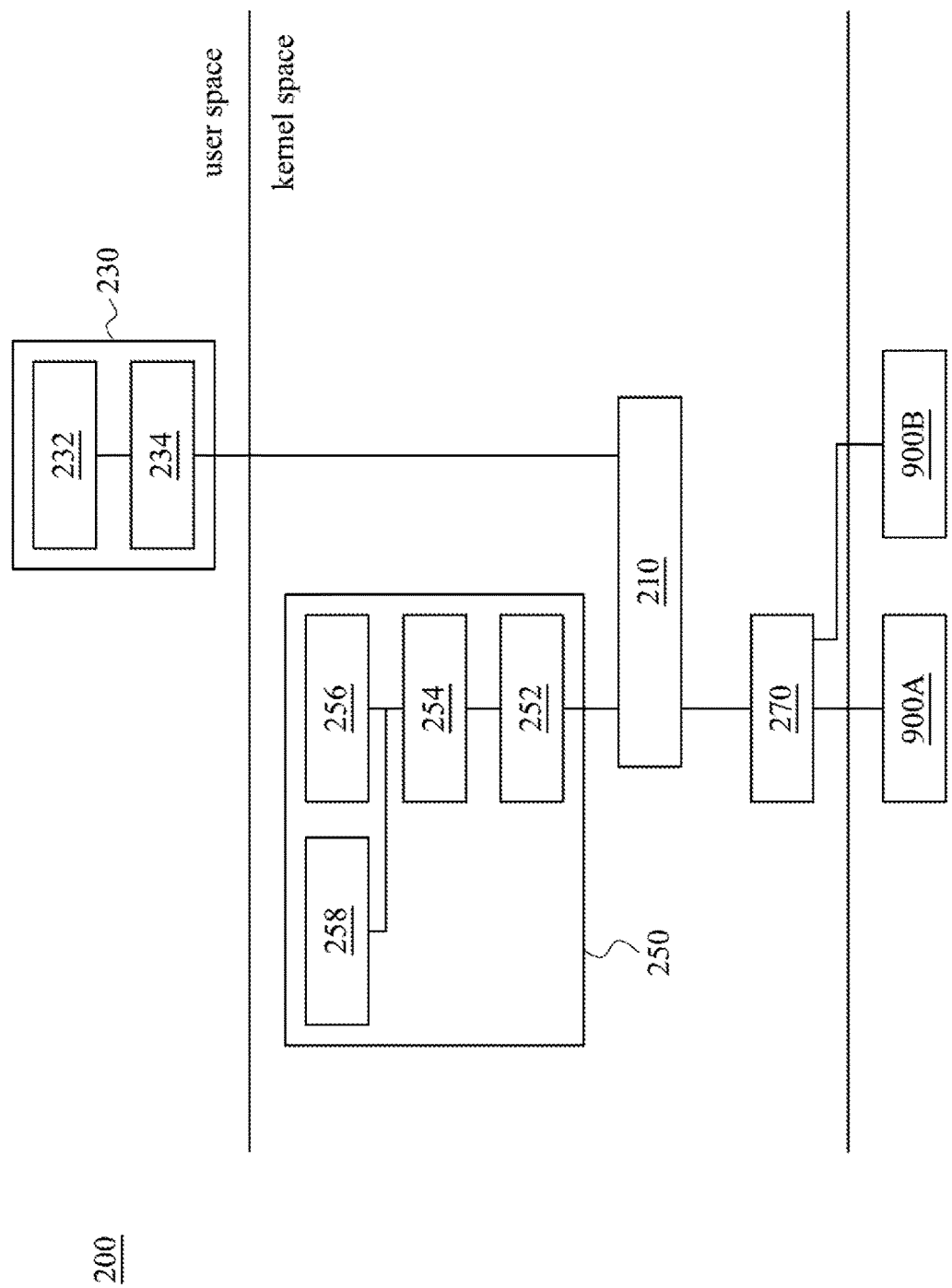
FIG. 2 is a schematic diagram illustrating a driving system according to some embodiments of the present disclosure.

Reference is made to FIG. 2. FIG. 2 is a schematic diagram illustrating a driver system 200 according to some embodiments of the present disclosure. For convenience of explanation and understanding, reference is made to both FIG. 1 and FIG. 2.

As illustrated in FIG. 2, the application 230 runs in the user space of the computer 100. The application 230 includes a BLUETOOTH event arbiter module 234 and a communication link module 232. A filter driver 210 is implemented in the kernel space of the computer 100 by the processor 130. A Microsoft BLUETOOTH stack 250 is implemented in the kernel space of the computer 100.

When the device 900A is connected to the computer 100 through the BLUETOOTH connection 170 (as illustrated in FIG. 1), the application 230 determines whether the computer 100 is a host or an accessory for the device 900A. If the computer 100 is determined to operate as a host for the device 900A, the computer 100 operates as the host for the device 900A through the Microsoft BLUETOOTH stack 250. The information transmits between the Microsoft BLUETOOTH stack 250 and the device 900A may be intercepted by the filter driver 210. The filter driver 210 sends the information intercepted to the application 230. The application 230 then sends the information intercepted to the device 900A through the filter driver 210 and the driver 270.

On the other hand, if the computer 100 is determined to operate as an accessory for the device 900A, the computer 100 operates as the accessory for the device 900A through a customized BLUETOOTH stack. The customized BLUETOOTH stack is implemented by the application 230 at the communication link module 232, which may make the computer 100 work as the accessory for the device 900A. The information transmits between the customized BLUETOOTH stack and the device 900A may be transmitted through the filter driver 210.

If the computer 100 works as a host and an accessory at the same time when connected to several devices 900A and 900B, the BLUETOOTH event arbiter module 234 may handle the conflict between the Microsoft BLUETOOTH stack 250 and the customized BLUETOOTH stack. Methods of handling the conflict between the Microsoft BLUETOOTH stack 250 and the customized BLUETOOTH stack includes sequencing the information and/or the packets transmitting from the Microsoft BLUETOOTH stack 250 and the customized BLUETOOTH stack. However, the present disclosure is not limited to the method mentioning above.

In some embodiments, when the device 900A or the device 900B is not connected to the computer 100, the processor 130 detaches the device 900A or the device 900B from the computer 100 by the application 230.

Figure 3:
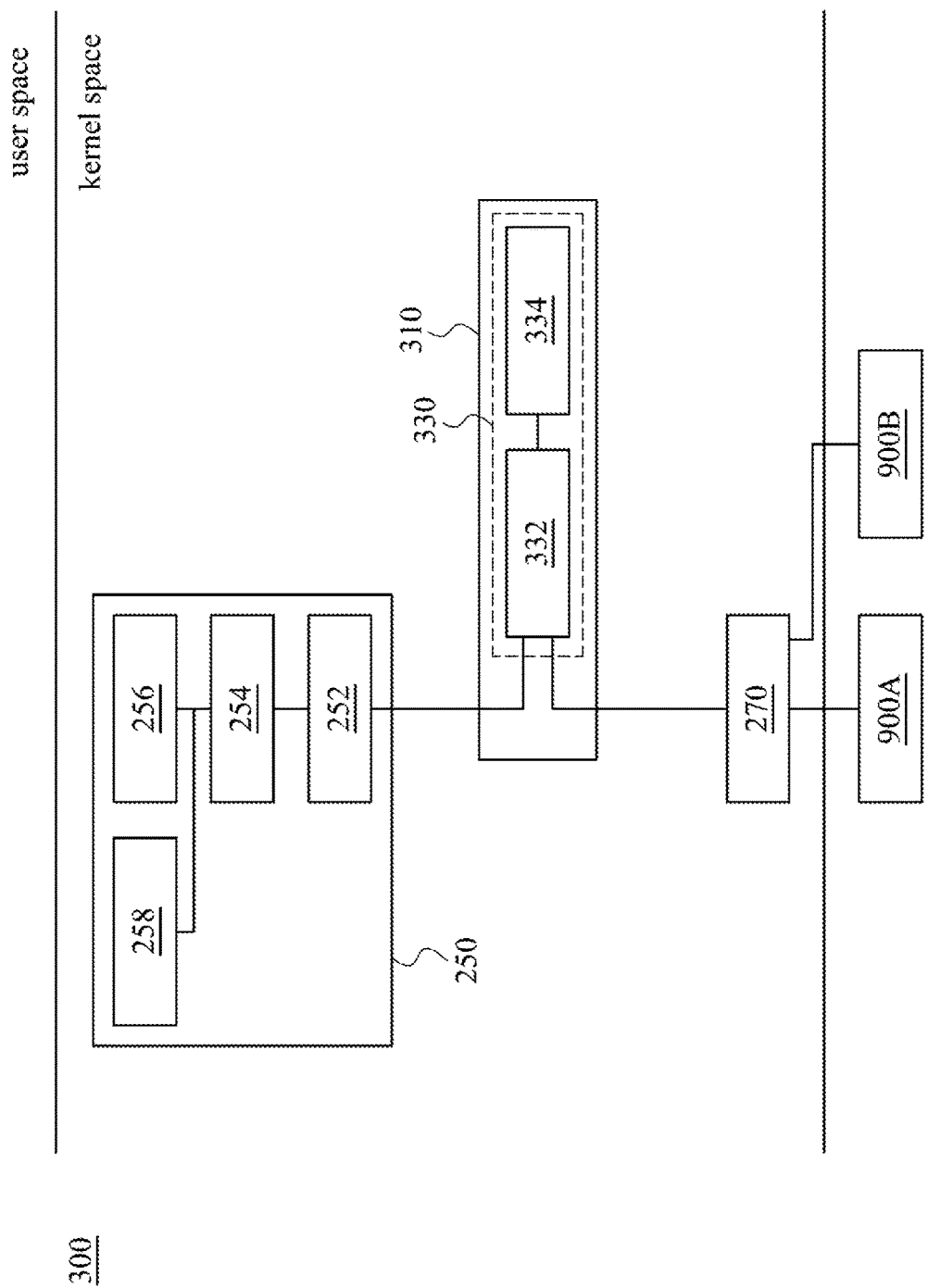
FIG. 3 is a flow chart illustrating a driving system according to some other embodiments of the present disclosure.

Reference is made to FIG. 3. FIG. 3 is a schematic diagram illustrating a driver system 300 according to some embodiments of the present disclosure. For convenience of explanation and understanding, reference is made to both FIG. 1 and FIG. 3.

As illustrated in FIG. 3, a filter driver 310 is implemented in the kernel space of the computer 100 by the processor 130. The application 330 runs in the filter driver 310. The application 330 includes a BLUETOOTH event arbiter module 334 and a communication link module 332. A Microsoft BLUETOOTH stack 250 is implemented in the kernel space of the computer 100.

When the device 900A is connected to the computer 100 through the BLUETOOTH connection 170 (as illustrated in FIG. 1), the application 330 determines whether the computer 100 is a host or an accessory for the device 900A. If the computer 100 is determined to operate as a host for the device 900A, the computer 100 operates as a host for the device 900A through the Microsoft BLUETOOTH stack 250. The information transmits between the Microsoft BLUETOOTH stack 250 and the device 900A may be intercepted by the filter driver 310. The filter driver 310 sends the information intercepted to the application 330. The application 330 then sends the information intercepted to the device 900A through the filter driver 310 and the driver 270.

On the other hand, if the computer 100 is determined to operate as an accessory for the device 900A, the computer 100 operates as an accessory for the device 900A through a customized BLUETOOTH stack. The customized BLUETOOTH stack is implemented by the application 330 at the communication link module 332, which may make the computer 100 work as the accessory for the device 900A.

If the computer 100 works as a host and an accessory at the same time when connected to several devices 900A and 900B, the BLUETOOTH event arbiter module 334 may handle the conflict between the Microsoft BLUETOOTH stack 250 and the customized BLUETOOTH stack. Methods of handling the conflict between the Microsoft BLUETOOTH stack 250 and the customized BLUETOOTH stack includes sequencing the information and/or the packets transmitting from the Microsoft BLUETOOTH stack 250 and the customized BLUETOOTH stack. However, the present disclosure is not limited to the method mentioning above.

In some embodiments, when the device 900A or the device 900B is not connected to the computer 100, the processor 130 detaches the device 900A or the device 900B from the computer 100 by the application 330.

It is to be noted that in some embodiments, the device 900A and the device 900B may be driven by the same driver 270. In some other embodiments, the device 900A and the device 900B may be driven by different driver 270.

Figure 4:
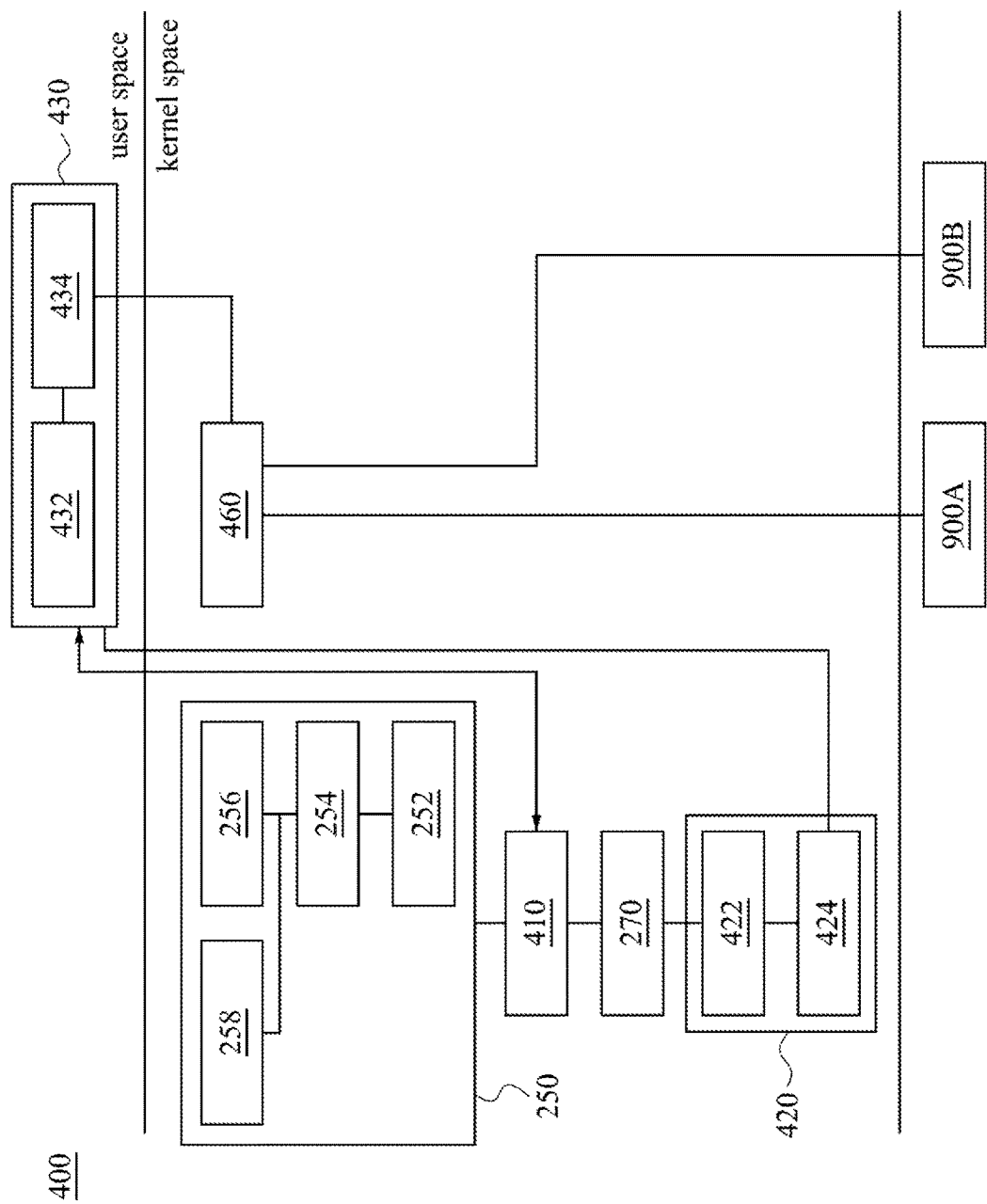
FIG. 4 is a flow chart illustrating a driving system according to some other embodiments of the present disclosure.

Reference is made to FIG. 4. FIG. 4 is a schematic diagram illustrating a driver system 400 according to some embodiments of the present disclosure. For convenience of explanation and understanding, reference is made to both FIG. 1 and FIG. 4.

As illustrated in FIG. 4, the application 430 runs in the user space of the computer 100. The application 430 includes a BLUETOOTH event arbiter module 434 and a communication link module 432. A filter driver 410 is implemented in the kernel space of the computer 100 by the processor 130. A Microsoft BLUETOOTH stack 250 is implemented in the kernel space of the computer 100 by the processor 130.

When the device 900A is connected to the computer 100 through the BLUETOOTH connection 170 (as illustrated in FIG. 1), the application 430 determines whether the computer 100 is a host or an accessory for the device 900A. If the computer 100 is determined to operate as a host for the device 900A, the computer 100 operates as the host for the device 900A through the Microsoft BLUETOOTH stack 250. The information transmits between the Microsoft BLUETOOTH stack 250 and the device 900A may be intercepted by the filter driver 410, and the filter driver 410 sends the information intercepted to the application 430. For example, the filter driver 410 intercepts the BLUETOOTH events from the Microsoft BLUETOOTH stack 250 and forwards the BLUETOOTH events to the BLUETOOTH event arbiter module 434. The information intercepted by the filter driver 410 comprises isochronous packets. That is, the filter driver 410 may focus on the data of USB isochronous packets.

On the other hand, if the computer 100 is determined to operate as an accessory for the device 900A, the computer 100 operates as the accessory for the device 900A through a customized BLUETOOTH stack. The customized BLUETOOTH stack is implemented by the application 430 at the communication link module 432, which may make the computer 100 work as the accessory for the device 900A.

The processor 130 (as illustrated in FIG. 1) is further configured to implement a USB emulated device (UDE) 420 in the kernel space, as illustrated in FIG. 4. USB stands for Universal Serial Bus. The USB emulated device 420 supports in the Windows operating system, for developing an emulated Universal Serial Bus (USB) host controller driver and a connected virtual USB device.

In some embodiments, the USB emulated device 420 is configured to emulate a BLUETOOTH adapter 422 and a BLUETOOTH driver 424. The USB emulated device 420 is a virtual software device configured to run the Microsoft BLUETOOTH stack 250. Moreover, the USB emulated device 420 forwards the USB traffic to the application 430. The USB traffic includes bulk packets, interrupt packets, and control packets. In some embodiments, the information is sent between the filter driver 410 and the USB emulated device 420 through the driver 270.

The processor 130 (as illustrated in FIG. 1) is further configured to implement a USBDK driver (USB development kit driver) 460. The USBDK driver 460 is configured to make the device 900A or 900B be accessed by the application 430 only. The USBDK driver 460 is a modified driver of an open source project. It is used by application 430 to hide the physical BLUETOOTH adapter (e.g. device 900A or 900B) from Windows operating system (OS) or Microsoft system, so that Windows OS may only see the USB emulated device 420 to load the Microsoft BLUETOOTH stack 250. That is, only the application 430 may access the physical BLUETOOTH adapter (e.g. device 900A or 900B).

If the computer 100 works as a host and an accessory at the same time when connected to several devices 900A and 900B, the BLUETOOTH event arbiter module 434 may handle the conflict between the Microsoft BLUETOOTH stack 250 and the customized BLUETOOTH stack.

The Microsoft BLUETOOTH stack 250 (as illustrated in FIG. 2 to FIG. 4) includes a BLUETOOTH USB 252, a BLUETOOTH Port 254, a BLUETOOTH low energy ENUM 256, and a BLUETOOTH ENUM 258. The BLUETOOTH USB 252 is a miniport that abstracts the bus interface from the BLUETOOTH Port 254. The BLUETOOTH Port 254 is a mini-driver that is loaded by the BLUETOOTH USB 252. The BLUETOOTH Port 254 includes four components: the HCI component, the SCO component, the L2CAP and the SDP. The HCI component communicates to the local Bluetooth-enabled radio through the Host Controller Interface (HCI) defined in the Bluetooth specification. The SCO component implements the Synchronous Connection-Oriented (SCO) protocol. This protocol supports creating point-to-point connections to a remote device. L2CAP implements the Bluetooth logical link control and adaptation protocol. This protocol supports creating a lossless channel to a remote device. SDP implements the Bluetooth Service Discovery Protocol.

Figure 5:
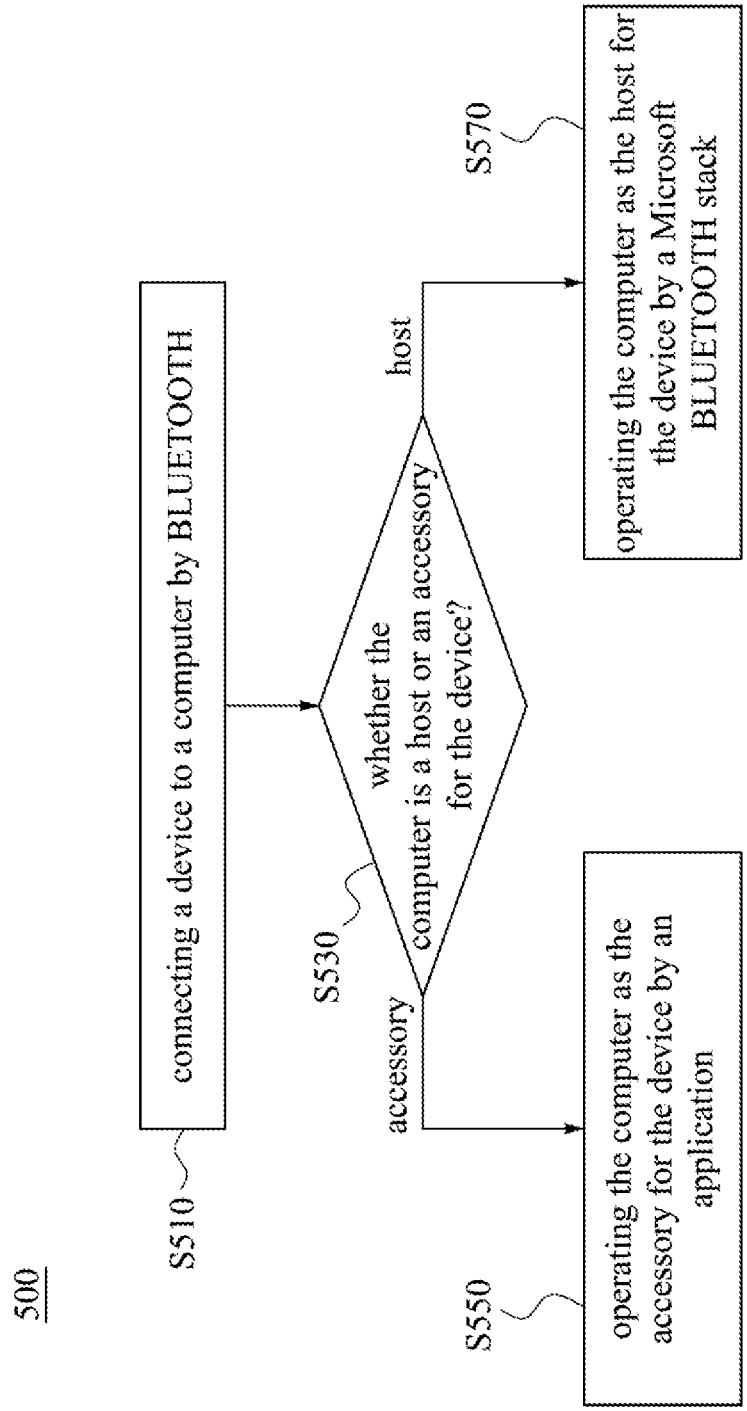
FIG. 5 is a flow chart illustrating a wireless connecting method according to some embodiments of the present disclosure.

Reference is made to FIG. 5. FIG. 5 is a flow chart illustrating a wireless connecting method 500 according to some embodiments of the present disclosure. The wireless connecting method 500 includes operations S510-S570.

For convenience of explanation and understanding reference is made to FIG. 1 and FIG. 5.

In operation S510, connecting a device to a computer by BLUETOOTH. In some embodiments, operation S510 may be performed by the processor 130, as illustrated in FIG. 1. For example, the processor 130 may connect the device 900A or 900B to the connection interface 150 of the computer 100 through BLUETOOTH connection 170.

In operation S530, determining whether the computer is a host or an accessory for the device. In some embodiments, operation S530 may be performed by the processor 130, as illustrated in FIG. 1. For example, the processor 130 may determine the computer 100 as an accessory or a host for the device 900A or 900B.

Reference is made to FIG. 1 to FIG. 5. In some other embodiments, operation S530 may be performed by the application 230, 330, or 430. In some embodiments, when the device 900A or the device 900B is connected to the computer 100, a descriptor information corresponding to the device 900A or 900B is sent to the application 230, 330, or 430. In some embodiments, the operation S530 is performed according to the descriptor. That is, in some embodiments, the computer 100 is classified as an accessory or a host for the device 900A or 900B according to the descriptor.

As illustrated in FIG. 5, if it is determined that the computer 100 is an accessory for the device 900A or 900B, operation S550 is performed. If it is determined that the computer 100 is a host for the device 900A or 900B, operation S570 is performed.

In operation S550, operating the computer as the accessory for the device by an application. Reference is made to FIG. 2 to FIG. 4, for example, when the device 900A is connected to the computer 100, the application 230, 330, or 430 may operate the computer 100 as the accessory for the device 900A. In some embodiments, the application 230, 330, or 430 may implement a customized BLUETOOTH stack at the communication link module 232, 332, or 432 to communicate with the device 900A, so as to operate the computer 100 as the accessory for the device 900A.

In operation S570, operating the computer as the host for the device by a Microsoft BLUETOOTH stack. Reference is made to FIG. 2 to FIG. 4, for example, when the device 900A is connected to the computer 100, the Microsoft BLUETOOTH stack 250 may communicate with the device 900A, so as to operate the computer 100 as the host for the device 900A. The filter driver 210, 310, or 410 intercepts the information between the Microsoft BLUETOOTH stack 250 and the device 900A, and the filter driver 210, 310, or 410 sends the information intercepted to the application 230, 330, or 430. The application 230, 330, or 430 then sends the information to the device 900A or the Microsoft BLUETOOTH stack 250.

Reference is made to FIG. 2 to FIG. 5. In some embodiments, if the computer 100 works as a host and an accessory at the same time when connected to several devices 900A and 900B, the BLUETOOTH event arbiter module 234, 334, or 434 may handle the conflict between the Microsoft BLUETOOTH stack 250 and the customized BLUETOOTH stack.

Another embodiment of the disclosure is a non-transitory computer-readable storage medium. The non-transitory computer readable storage medium stores instructions for performing the method 500 in aforesaid embodiment shown in FIG. 5.

The kernel space is strictly reserved for running a privileged operating system kernel, kernel extensions, and most device drivers. The user space is the memory area where application software and some drivers execute. The concept of the kernel space and the user space are known to one of ordinary skill in the art, and may not be addressed in details.

According to the embodiment of the present disclosure, it is understood that the embodiment of the present disclosure is to provide a wireless connecting method, a computer, and a non-transitory computer-readable storage medium, in order to operate the computer as the accessory and the host at the same time when the computer is connecting to devices by BLUETOOTH. Furthermore, the implemented application that makes the computer work as an accessory for the connected device may co-exist with the Microsoft BLUETOOTH stack.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A wireless connecting method, comprising:
   connecting a device to a computer by BLUETOOTH;
   determining the computer is an accessory or a host for the device;
   operating the computer as the host for the device by a Microsoft BLUETOOTH stack if the computer is the host for the device; and
   operating the computer as the accessory for the device by an application if the computer is the accessory for the device;
   wherein the computer is operated as the accessory and the host at the same time.

2. The wireless connecting method of claim 1, further comprising:
   intercepting information between the Microsoft BLUETOOTH stack and the device by a filter driver; and
   sending the information intercepted by the filter driver to the application.

3. The wireless connecting method of claim 2, wherein the filter driver is implemented in a kernel space and the application runs in a user space.

4. The wireless connecting method of claim 2, wherein the filter driver is implemented in a kernel space and the application runs in the filter driver.

5. The wireless connecting method of claim 1, further comprising:
   implementing a customized BLUETOOTH stack by the application for the computer to operate as the accessory for the device.

6. The wireless connecting method of claim 5, further comprising:
   handling a plurality of conflict between the Microsoft BLUETOOTH stack and the customized BLUETOOTH stack by the application when the computer is operated as the host and the accessory at the same time.

7. The wireless connecting method of claim 1, further comprising:
   implementing a USB emulated device (UDE) in the kernel space;
   wherein the USB emulated device is configured to emulate a BLUETOOTH adapter, to run the Microsoft BLUETOOTH stack, and to forward USB traffic to the application.

8. The wireless connecting method of claim 1, further comprising:
    implementing a USBDK driver (USB development kit driver);
    wherein the USBDK driver is configured to make the device be accessed by the application only.

9. The wireless connecting method of claim 1, wherein connecting the device to the computer comprises:
    sending a descriptor information corresponding to the device to the application for the application to determine whether the computer is the accessory or the host for the device.

10. A computer, comprising:
    a memory, wherein the memory comprises an application to handle a device connected to the computer by BLUETOOTH; and
    a processor configured to run the application to determine whether the computer is a accessory or a host for the device;
    wherein the processor operates the computer as the host for the device by a Microsoft BLUETOOTH stack if the computer is the host for the device, and the processor operates the computer as the accessory for the device by an application if the computer is the accessory for the device;
    wherein the computer is operated as the host and the accessory at the same time.

11. The computer of claim 10, wherein the processor is further configured to implement a filter driver, and the filter driver is configured to intercept information between the Microsoft BLUETOOTH stack and the device and to send the information intercepted by the filter driver to the application.

12. The computer of claim 11, wherein the filter driver is implemented in a kernel space and the application runs in a user space.

13. The computer of claim 11, wherein the filter driver is implemented in a kernel space and the application runs in the filter driver.

14. The computer of claim 10, wherein the application comprises a communication link module, wherein the processor is further configured to implement a customized BLUETOOTH stack at the communication link module for the computer to operate as the accessory for the device.

15. The computer of claim 10, wherein the application further comprises a BLUETOOTH event arbiter module, and the BLUETOOTH event arbiter module is configured to handle a plurality of conflict between the Microsoft BLUETOOTH stack and the customized BLUETOOTH stack by the BLUETOOTH event arbiter module when the computer is operated as the host and the accessory at the same time.

16. The computer of claim 11, wherein the processor is further configured to implement a USB emulated device (UDE) in the kernel space, and the USB emulated device is configured to emulate a BLUETOOTH adapter, to run the Microsoft BLUETOOTH stack, and to forward USB traffic to the application.

17. The computer of claim 12, wherein the information intercepted by the filter driver comprises isochronous packets.

18. The computer of claim 11, wherein the processor is further configured to implement a USBDK driver (USB development kit driver), and the USBDK driver is configured to make the device be accessed by the application only.

19. A non-transitory computer-readable storage medium storing a computer program performing a wireless connecting method, wherein the wireless connecting method comprises:
    connecting a device to a computer by BLUETOOTH;
    determining the computer is a host or an accessory for the device;
    operating the computer as the host for the device by a Microsoft BLUETOOTH stack if the computer is the host for the device; and
    operating the computer as the accessory for the device by an application according to the program code if the computer is the accessory for the device;
    wherein the computer is operated as the host and the accessory at the same time.

20. The non-transitory computer-readable storage medium of claim 19, wherein the wireless connecting method further comprises:
    intercepting information between the Microsoft BLUETOOTH stack and the device by a filter driver; and
    sending the information intercepted by the filter driver to the application.

* * * * *